(12) United States Patent
Grohs et al.

(10) Patent No.: US 6,415,058 B2
(45) Date of Patent: Jul. 2, 2002

(54) SYSTEM FOR COMPRESSION OF DIGITAL IMAGES COMPRISING LOW DETAIL AREAS

(75) Inventors: Randall E. Grohs, Eagle; Brent M. Bradburn, Boise, both of ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/181,066

(22) Filed: Oct. 27, 1998

(51) Int. Cl.$^7$ .................................................. G06K 9/36

(52) U.S. Cl. ...................................... 382/239; 382/224

(58) Field of Search ................................ 382/232, 233, 382/234, 235, 236, 237, 238, 239, 240, 241, 242, 243, 244, 245, 246, 247, 248, 249, 108, 195, 224, 225, 272, 286, 250; 375/240.24; 358/433

(56) References Cited

U.S. PATENT DOCUMENTS

| | | | | |
|---|---|---|---|---|
| 5,432,870 A | | 7/1995 | Schwartz | 382/232 |
| 5,703,965 A | * | 12/1997 | Fu et al. | 382/232 |
| 5,754,697 A | * | 5/1998 | Fu et al. | 382/232 |
| 5,867,602 A | * | 2/1999 | Zandi et al. | 382/248 |
| 6,058,215 A | * | 5/2000 | Schwartz et al. | 382/244 |

* cited by examiner

Primary Examiner—Phuoc Tran
Assistant Examiner—Amir Alavi
(74) Attorney, Agent, or Firm—Matthew L. Wade

(57) ABSTRACT

A computer for compressing a digital image. The computer is operable to decompose a digital image into a set of tiles and to classify certain tiles from the set as being low detail tiles. The computer is further operable to transform each tile from the set of tiles into a series of basis function coefficients to represent the tile in the frequency domain. The computer is responsive to a tile having more than four different pixel values and classified as a low detail tile by transforming the tile into a first series of basis function coefficients. The first series of basis function coefficients includes only four coefficients that have a non-zero value.

13 Claims, 5 Drawing Sheets

SYSTEM FOR COMPRESSION OF DIGITAL IMAGES COMPRISING LOW DETAIL AREAS

CROSS REFERENCE TO RELATED APPLICATIONS

This application includes subject matter related to co-pending application Ser. No. 09/181,031 entitled: "System For Compression Of Digital Images Comprising Background Pixels", and the co-pending patent application Ser. No. 09/179,925 entitled: "Apparatus And Method For Compressing Huffman Encoded Data", each of which are incorporated by reference herein, assigned to the same assignee as this application, and filed on even date herewith.

FIELD OF THE INVENTION

This invention relates to the compression of digital images, and more particularly to the compression of digital images having low-detail areas.

BACKGROUND OF THE INVENTION

A digital image is typically displayed or printed in the form of a rectangular array of "picture elements" or "print elements". For purposes of this application, both "picture elements" and "print elements" are referred to herein as "pixels". Digital images are typically represented in a computer by one or more arrays of binary numbers. For example, a monochrome digital image can be represented in a computer by a single array of binary numbers. Each binary number in the array defines a gray-level value for an associated pixel. The position of the binary number in the array describes the spatial location of the pixel.

A color digital image can be represented in a computer by three arrays of binary numbers. Each array (alternatively referred to herein as an "image plane") representing an axis of a suitable color coordinate system in accordance with the well known trichromatic theory. The color of a pixel in the digital image is defined by an associated binary number (defining one of three color components from the color coordinate system) from each array. It is noted that there are many color coordinate systems that can be used to represent the color of a pixel. These color coordinate systems include a "Red-Green-Blue" (RGB) coordinate system and a cyan-magenta-yellow (CMY) coordinate system. The former is commonly used in monitor display applications, the latter is commonly used in printing applications. For purposes of this application, each binary number representing a pixel is referred to herein as a "pixel component" or alternatively as a "pixel component value". In addition, the phrase "pixel value" refers to the value of the number or numbers defining the pixel. It is noted that this can be described with reference to the color of the pixel. Thus, a pixel can be said to have a value corresponding to the color or gray-scale level of white. This indicates that the binary number or numbers associated with the pixel has a total value that define the pixel as white.

The amount of data used to represent a digital image can be extremely large. Consider, for example, a color digital image consisting of 1024×1024 pixels. If the pixels are represented in the computer by three image planes of 8-bit numbers, the digital image would occupy over 1 megabyte of storage space.

The large amount of data required to represent a digital image in a computer can result in significant costs that are associated both with increased storage capacity requirements, and the computing resources and time required to transmit the data to another computing device. In order to reduce these costs, digital image compression techniques have been and are continuing to be developed.

Digital image compression techniques can generally be divided into two classes: lossless and lossy. In lossless compression, the digital image reconstructed after compression is identical, pixel by pixel, to the original image. A common lossless compression technique is the well known Lempel-Ziv-Welch (LZW) compression scheme. See, for example, U.S. Pat. No. 5,479,587. That Patent is incorporated herein by reference. A another lossless compression technique is described by the "Joint Bi-level Image Experts Group Compression standard" (JBIG).

In lossy compression, the reconstructed digital image may be somewhat degraded with respect to the original digital image in order to attain higher compression ratios than those of lossless procedures. One popular lossy compression scheme is referred to as "transform coding". See Baxes, G. A., *Digital image Processing, Principles and Applications*, pp 198–211, ISBN 0-471-00949-0 (1994). Those pages are incorporated herein by reference.

In general, transform encoding is accomplished by decomposing each image plane of a digital image into a set of two-dimensional blocks of pixel component values for a sub-array of pixels. These blocks are typically small, such as 4×4 or 8×8 blocks of component values. Each block is then transformed into the frequency domain by use of a frequency transform. This reduces the block into a series of basis functions. It is noted that typically the first basis function is a constant scalar value. This is sometimes referred to as the "DC" component or alternatively as the "DC coefficient" for the transform. While in the frequency domain, the amount of data required to represent the block can be reduced by quantization. This is often accomplished by using criteria based on the visibility of each basis functions. After quantization, the amount of data representing the block can be even further reduced by using an entropy encoding (e.g., Huffman coding) technique.

A number of transform coding schemes have been developed. One widely used transform coding scheme has been standardized by the published and generally available works of the Joint Photographic Experts Group (JPEG). See generally Pennebaker, W. B., and Mitchell, J. L., *JPEG: Still Image Compression Standard*, ISBN 0-442-01272-1 (1993). The JPEG compression standard in lossy mode makes use of the Discrete Cosine Transform (DCT). Like many transform coding schemes, the JPEG compression scheme is adjustable. That is to say that the number of frequency components discarded during quantization can be varied to produce variable compression ratios. Unfortunately, however, as the level of quantization increases to achieve higher compression ratios, image quality can be degraded significantly.

As just discussed, digital image compression techniques can be used to reduce the amount of data required to represent a digital image in a computer. These techniques can reduce the computing costs associated with storing and transmitting digital images. There are, however, significant costs that can be incurred in using these compression techniques. For example, there can be substantial system overhead and time required to perform the compression and decompression operations. In addition, there is a trade off between the use of lossy compression techniques and lossless compression techniques. In general, lossy compression can be used to achieve high compression ratios. Image quality, however, can be significantly degraded. Lossless compression, on the other hand, does not degrade image quality but usually results in relatively low compression ratios.

SUMMARY OF THE INVENTION

An apparatus for compressing a digital image comprising a means for decomposing said digital image into a set of tiles and for classifying a tile from said set as a low-detail tile and a means for transform encoding each tile in said set of tiles connected to said decomposing means; said transform encoding means responsive to said decomposing means classifying a tile from said set of tiles as a low detail tile to determine at least one average pixel value from said low detail tile and to create transform coded data for said tile based upon said at least one average pixel value.

DETAILED DESCRIPTION OF THE INVENTION

For purposes of this discussion, a sub-array of pixels in a digital image, in general, is referred to herein as a "tile". A single color (or single gray-scale) tile is referred to herein as a "monotone tile". A two color (or two gray-scale level) tile is referred to herein as a "binary tile". The blocks of pixel component values that make up a monotone-tile are referred to herein as monotone blocks. The blocks of pixel component values that make up a binary tile are referred to herein as binary blocks.

Prior art transform encoding of a digital image is typically performed by first decomposing or identifying from the digital image a set of tiles. Each tile comprising a set of blocks. The blocks (if necessary) are then converted into a more suitable color coordinate system (referred to herein as a color space conversion). This is accomplished on a pixel by pixel basis. After the color space conversion, the blocks are then transformed into the frequency domain by use of a frequency transform. This typically reduces each block into a series of basis functions and at the same time orders the basis functions from low to high spatial frequencies. The basis function coefficients can then be quantized and entropy encoded.

Figure 1:
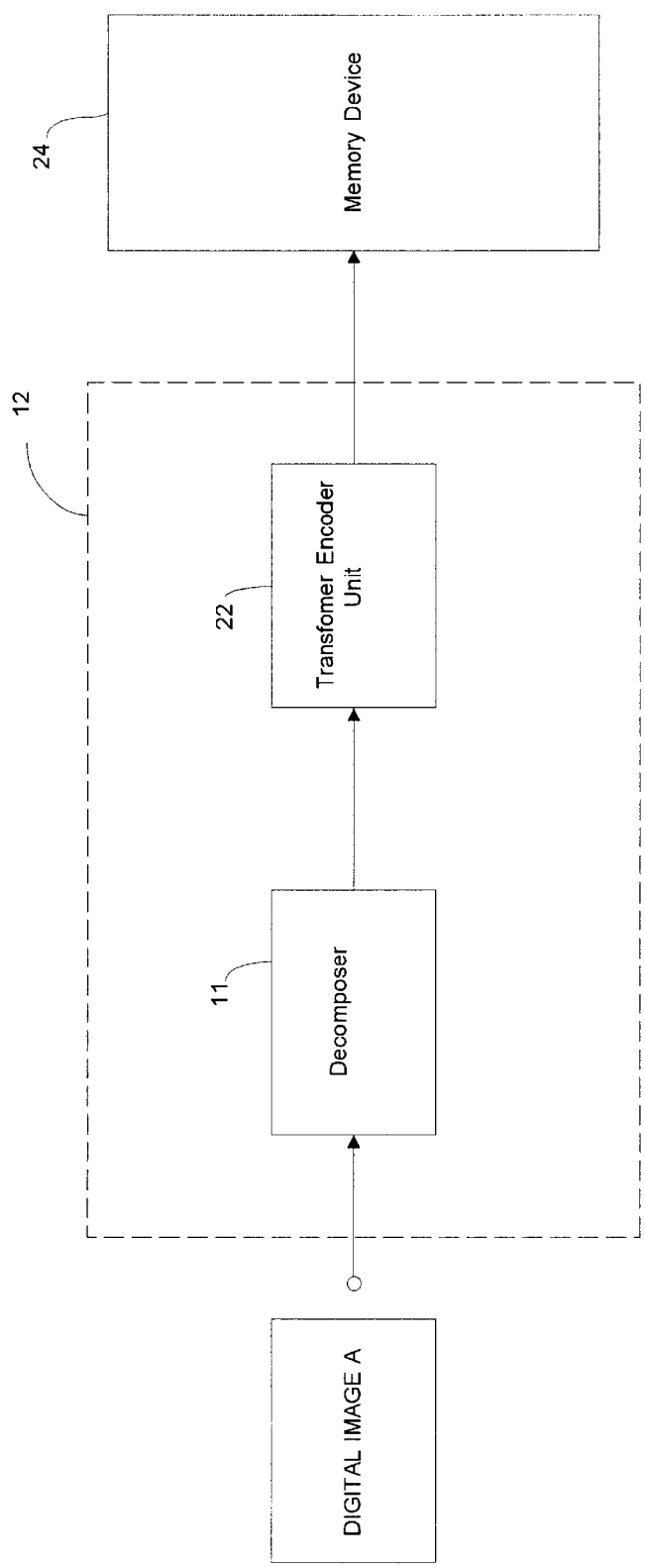
FIG. 1 provides a high level diagram of a Compression Apparatus that operates in accordance with the present invention.

The present invention can be used to significantly improve transform encoding procedures. In general, this is accomplished by classifying certain tiles as "low-detail tiles" and applying the transform encoding procedure to a reduced resolution representation of these tiles. To illustrate a first embodiment of the present invention, FIG. 1 provides a high level diagram of Compression Apparatus 12. As will be clear to a person skilled in the art, Compression Apparatus 12 can be incorporated into a number of computing devices in order to provide improved compression capability. These computing devices include, but are not limited to, personal computers, scanners, printers and facsimile devices.

In general, Compression Apparatus 12 operates to receive a digital image and convert the digital image into encoded data in accordance with the JPEG lossy mode compression standard. The encoded data can then be stored, as shown, in Memory Device 24. For the rest of this discussion, reference will be made to the operation of Compression Apparatus 12 to compress Digital Image A. Digital Image A is assumed to be a 24 bit color digital image in an RGB coordinate system. It is noted, however, that Compression Apparatus 24 can operate to compress other types of digital images expressed in other color coordinate systems, all in accordance with the principles of the present invention.

As shown, Compression Apparatus 12 includes Decomposer 11 and Transform Encoder Unit 22. In general, Decomposer 11 is adapted to receive Digital Image A and to convert the image into a set of 8 by 8 tiles for JPEG lossy mode compression. Because Digital Image A is defined by a red, green and blue image plane- each tile in the set of tiles comprises three blocks (i.e., one block for each image plane).

After generating the tiles from Digital Image A, Decomposer 11 then determines whether any of the tiles in the set can be classified as a "low-detail tile" or a "high-detail tile". In this embodiment, a tile is determined to be a "low-detail tile" if the tile can be adequately represented by a lower resolution tile comprising four quadrants of smoothed pixel values. For ease of discussion, such a tile is referred to herein as a "four-value tile". A tile is determined to be a "high-detail" tile if the tile is not classified as a "low-detail tile".

Figure 2:
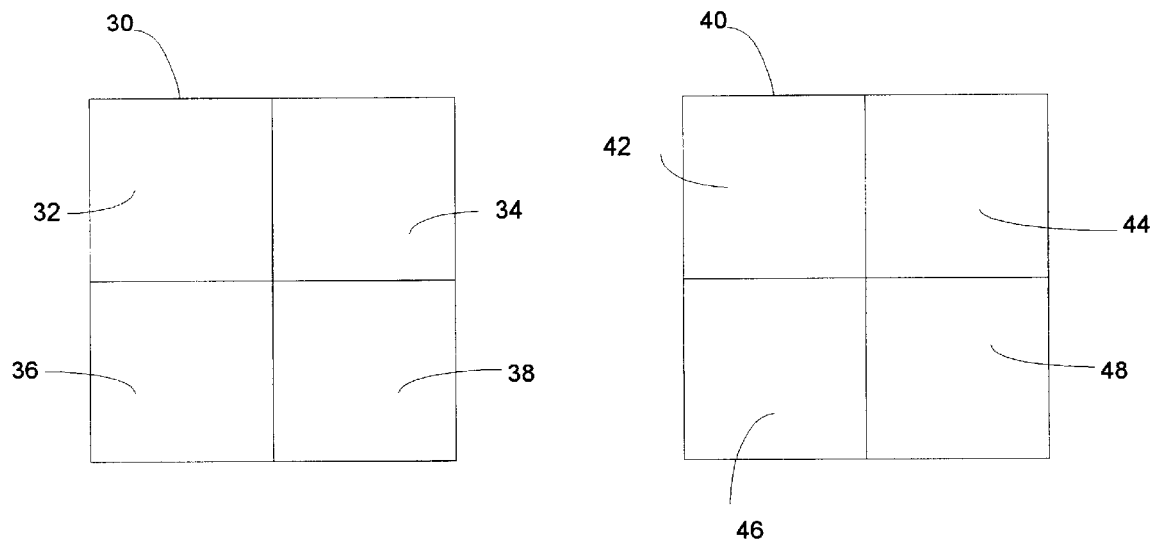
FIG. 2 depicts one type of low-resolution tile.

To illustrate a four-value tile, reference is made to FIG. 2. FIG. 2 depicts a typical tile, Tile 30, from Digital Image A. As shown, Tile 30 can be thought of as comprising four quadrants of pixel values. These quadrants are labeled as Quadrant 32, Quadrant 34, Quadrant 36 and Quadrant 38. A four-value tile derived from Tile 30 is illustrated as Tile 40. As shown, Tile 40 is comprised of four quadrants: Quadrant 42, Quadrant 44, Quadrant 46 and Quadrant 48. Quadrant 42 is comprised of pixels that all have the same value that is representative of an average of the pixels from Quadrant 32. Quadrant 44 is comprised of pixels that all have the same value that is representative of an average of the pixels from Quadrant 34. Quadrant 46 is comprised of pixels that all have the same value that is representative of an average of the pixels from Quadrant 36. Quadrant 48 is comprised of pixels that all have the same value that is representative of an average of the pixels from Quadrant 38.

It can be seen that one approach to making the determination that a tile can be adequately represented by a four value tile, is to base this determination upon the capability of the human visual system. That is to say, if the human eye can not discern between the original tile and a four-value tile (derived from the original tile), then that tile can be classified as a low-detail tile.

This is the approach taken in this embodiment. In this embodiment, to determine whether to classify a tile as a low-detail tile, Decomposer 11 performs the following general procedure for each block in the tile: 1.) Determine an average pixel component value; 2.) Determine if the difference between the average pixel component value and any of the pixel component values in the block are outside a threshold range, and if so, classify the tile as a low-detail tile. If after each block is analyzed, and, the tile has not been classified as a low-detail tile, Decomposer 11 then classifies the tile as a high-detail tile.

After a tile has been classified, Decomposer 11 operates to transmit the tile, or its four-tile representation, to Transform Encoder Unit 22. That is, if a tile is classified as a high-detail tile the tile is simply transmitted to Transform Encoder Unit 22 for transform coding. If, however, a tile is classified as a low-detail tile, the four-value tile representation of that tile is then transmitted to Transform Encoder Unit 22. Transform Encoder Unit 22 responds to the tile received to encode the tile according to the JPEG lossy mode compression standard. The encoded data is then appropriately stored in Memory Device 24.

In addition, for each tile transmitted to Transform Encoder Unit 22 that is classified as a low-detail tile, a first signal is also transmitted from Decomposer 11 to Transform Encoder Unit 22. This first signal informs Transform Encoder Unit 22 that the incoming tile is a four-value tile.

As just mentioned, for each tile received, Transform Encoder Unit 22 operates to convert the tile to encoded data in accordance with the JPEG lossy mode compression standard. This is accomplished by first performing a color space conversion, and calculating DCT Coefficients for each block to convert each block into the frequency domain. The DCT coefficients are then quantized and Huffman encoded by making use of standard quantization tables and Huffman tables.

Figure 3:
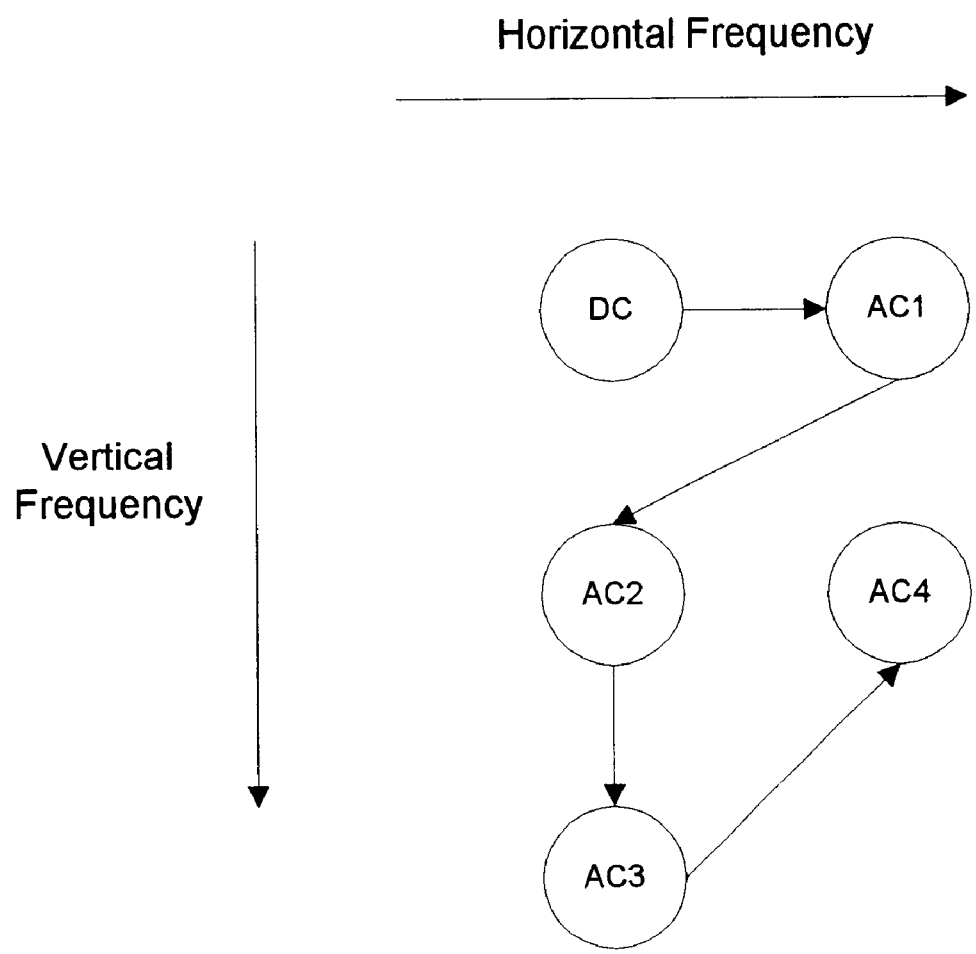
FIG. 3 depicts the first five quantized coefficients ordered in accordance with the JPEG compression standard.

Importantly, as can be seen by a person skilled in the art, the encoding of each four-value tile is a simple procedure. For example, there are only four different pixel values in the entire tile that need be converted from an RGB color space to a YCrCb color space. In addition, only four DCT coefficients need be determined (corresponding to the lower four spatial frequencies for each block from the tile) as it is known that all the rest of the DCT coefficients will go to zero. This is because there is only four pixel component values in each block for a four-value tile. Thus, the transform of each block that corresponds to a low-detail tile into the frequency domain is significantly simplified as only four DCT coefficients need be calculated. Further, quantization is also simplified as there are only four quantized coefficients ( for each block, that need be determined). Finally, the Huffman encoding is simplified because it is known that all but four coefficients that correspond to the lower four spatial frequencies are non-zero. It is noted that because the JPEG compression standard specifies the zigzag ordering of the DC and AC DCT coefficients prior to Huffman encoding, the four quantized coefficients that are known to be non-zero are actually the first, second, third and fifth DCT coefficient. This is represented in FIG.3. FIG. 3 illustrates the first five quantized coefficients ordered in accordance with the JPEG compression standard. As shown, the DC, AC1, AC2 and AC4 DCT coefficients actually correspond to the first four spacial frequencies for the DCT.

It can be seen that the system overhead associated with Apparatus 12 compressing a digital image can be much less as compared to prior art transform encoding compression apparatus. This is especially true if the digital image comprises a significant number of tiles that can be classified as a low-detail tile. It is also noted that it can be seen that the system overhead associated with decompressing a digital image compressed using Apparatus 12 is also reduced.

In addition, it has been found that reducing the resolution of the low-detail tiles can result in reducing Moire patterns that are due to the visual effects of spatial aliasing. See Baxes, G. A., *Digital image Processing, Principles and Applications*, pp 46–47, ISBN 0-471-00949-0 (1994). Those pages are incorporated herein by reference.

One important use of the present invention is to compress digital images prior to transmitting the digital image to a printer for printing. Many laser printers are configured to receive data from a host computer in a control language format. A widely used control language is called "printer control language" (PCL). When operating in a PCL environment, a host computer configures a data stream to include both print function commands and interspersed print data. The printer converts the received data stream into a list of simple commands, called display commands, which define what must be printed. The printer then processes the display commands and renders the described objects into a digital image suitable for printing. This type of digital image is commonly referred to as a raster bit map. In general, only a small proportion of the printer's available memory is allocated to store of the print function commands and interspersed data, with the majority of the print buffer area being given over to support of processing functions and the resultant raster bit map image. Other printer systems employ a procedure wherein the host computer rasterizes image data and sends it to the printer in the rasterized form. This enables the use of a host computer's processor, which typically has greater capability than the printer processor to accomplish the rasterization of the image. The host computer, after the rasterization has been performed, then transfers the rasterized data in to the printer. Sometimes the rasterized data is first compressed before transmitting the data to the printer in order to reduce the time and computing resources required to transmit the rasterized data in addition to reducing the required amount of printer memory required to receive the digital image. In this case, the printer includes decompression capability that is used to decompress the rasterized data. After decompression, the rasterized data can then be transmitted to the printer's video buffer for printing. For examples of such systems see, U.S. Pat. No. 5,490,237 entitled: "Page Printer Having Improved System For Receiving And Printing Raster Pixel Image Data From A Host Computer". Also see U.S. Pat. No. 5,706,410 entitled: "Printing System Having Control Language Command And Raster Pixel Image Data Processing Capability". Both of these patents are incorporated herein by reference.

Figure 4:
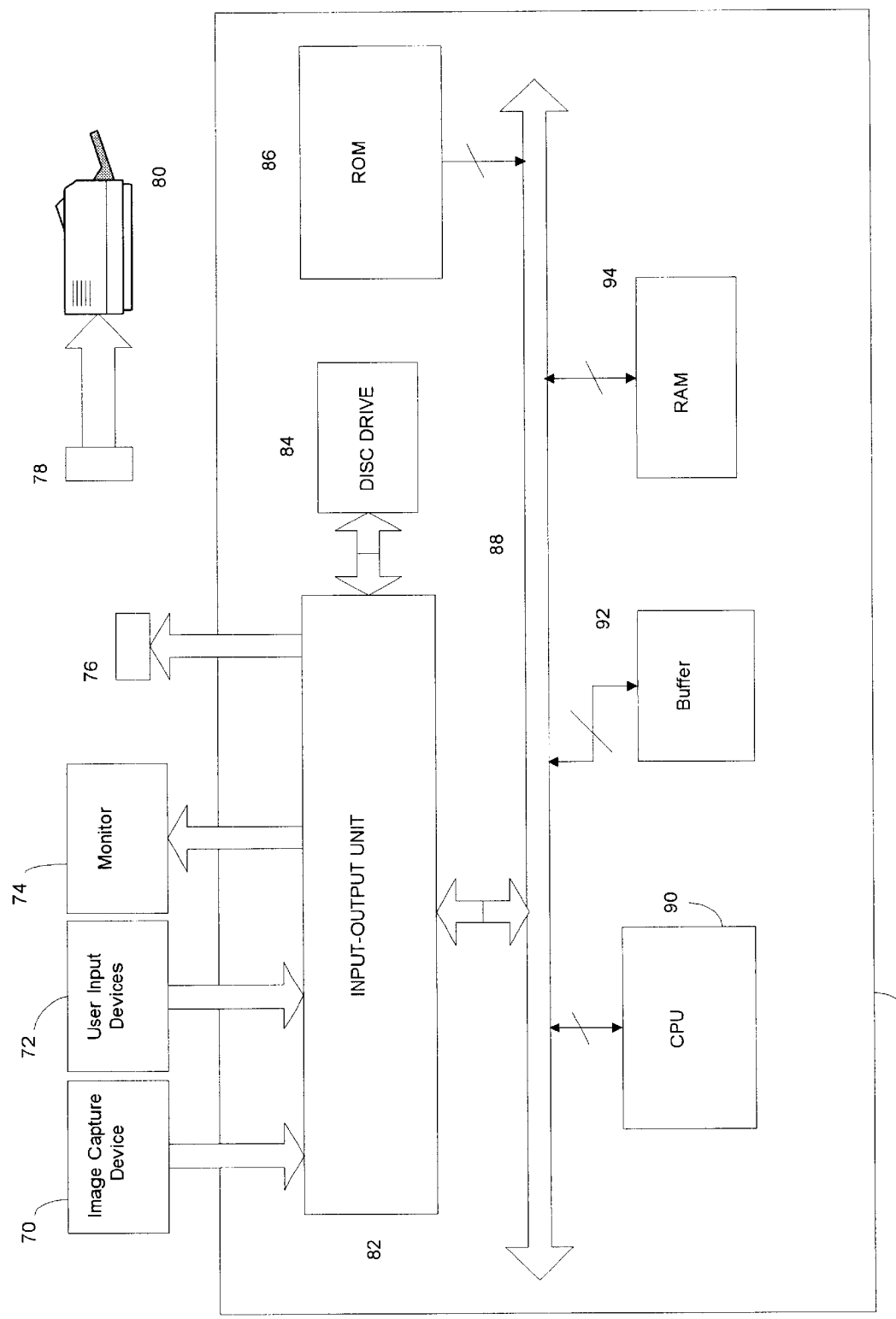
FIG. 4 depicts a second embodiment of the present invention in the form of a Computer.

The present invention can be used to improve the capability of computer systems to compress rasterized images for transmission to a printer. To illustrate this, FIG. 4 depicts a second embodiment of the present invention in the form of Computer 68. In this embodiment, Computer 68 is assumed to be a personal computer. As shown, the major subsystems of Computer 68 include an Input-Output Unit 82, Central Processing Unit (CPU) 90, Disc Drive 84, Random Access Memory 94, Buffer 92 and Read Only Memory (ROM) 86 all interconnected via Internal Bus 88. During operation, basic functions of Computer 68 are all controlled in a standard manner by a Basic Input Output System and a standard Operating Software.

Computer 68 can run various types of applications that allows a user (via interaction with User Input Devices 72) to-create digital images for display onto Monitor 74. In addition, Computer 68 can also receive digital images from Image Capture Device 70 via Input-Output Unit 82.

After the creation of a digital image by using the application software mentioned above, or after receiving a digital image from the Image Capture Device 70, Computer 68 can then rasterize the image for printing onto Printer 80 by CPU 90 under the direction of a print driver software and using standard techniques. After the digital image has been rasterized, the rasterized image can then be compressed and transmitted over a network (not shown) via Input-Output Unit 82 and Network Connection 76 and Network Connection 78 to Printer 80.

The compression of the rasterized image is accomplished by the user (or alternatively the print driver) invoking compression software stored onto Disc Drive 84. The compression software then directs CPU 90 to compress the rasterized image in accordance with the principles of the present invention. In general, CPU 90 operates to convert the rasterize image, tile by tile, into encoded data using a JPEG lossy mode compression standard. It is noted that this accomplished for each tile by performing a color space conversion to convert each tile from an RGB color coordinate system to a YCrCb color coordinate system. Each block in the tile is then transformed into the frequency domain by determining DCT coefficients. The coefficients are then quantized using standard quantization tables. After quantization, the resulting data is then Huffman encoded using standard Huffman tables.

Figure 5:
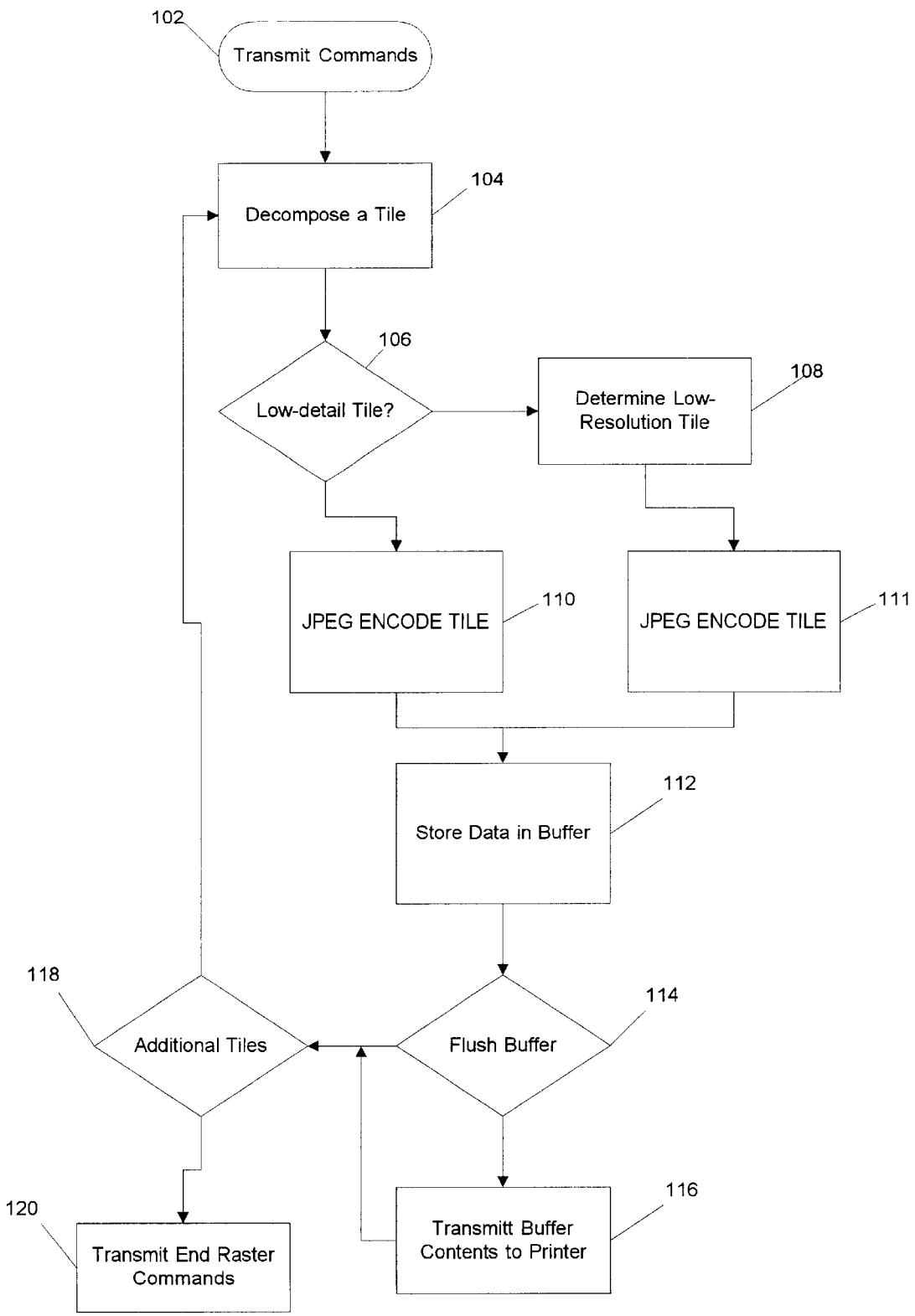
FIG. 5 depicts a flow diagram to illustrate a second embodiment of the present invention.

In order to explain further the operation of CPU 90 to compress a rasterized image under the direction of the compression software, reference is made to the logic flow diagrams depicted in FIG. 5. To aide in this description, it is assumed that the rasterized image currently being compressed is a 24-bit color digital image in an RGB color coordinate system. First CPU 90 operates to transmit a pre-determined set of commands to Printer 80 in order to place Printer 80 in a proper state to receive the compressed raster data (box 102). In this embodiment, these commands are expressed in PCL. It is noted, however, that in other embodiments other printer control languages could be used. CPU 90 then operates to decompose 104 (i.e., identify) a tile from the raster image that is suitable for JPEG lossy mode compression. After the tile (referred to herein as the "current tile") is identified, a determination is then made as to whether the current tile can be classified as a "low-detail tile" (decision step 106). In general, this determination is made by measuring the level of detail in the tile. If the level of detail is determined to be above or below a pre-determined threshold, the current tile is then classified as a "low-detail" tile. As can be seen by a person skilled in the art, the level of detail can be measured in a number of ways and numerous threshold values can be used. This can be dependant in part upon the specific application and type of digital image being compressed. In this embodiment, the level of detail is measured by calculating a standard deviation for the pixel values in the tile. This standard deviation is then compared to a threshold value. If the standard deviation is below this threshold value, then the tile is classified as a low-detail value.

If the current tile is classified as a low-detail tile a low-resolution tile is then determined (108). This is accomplished by determining a four-value tile for the current tile. Each of the four values representing a unique set of averaged pixel values from the current tile. After the four-value tile has been defined, CPU 90 then encodes the four-value tile in accordance with the JPEG compression standard. The encoded data is generated, however, with CPU 90 in a special state. While in this state, CPU 90 is pre-configured to generate the encoded data for the four-value tile in an efficient manner. That is to say, it is understood that the tile that is being encoded only has (at most) four pixel values. As can be seen by a person skilled in the art, this simplifies several aspects of the encoding procedure. First the color space conversion is determined for the entire tile by converting only four pixel values. Second, only the four DCT coefficients corresponding to the lower four spatial frequencies of the DCT are determined and quantized. The resulting data is then Huffman Encoded. It is noted that the Huffman encoding is also simplified as it is known that all the DCT coefficients are zero except for the DC and three AC coefficients that correspond to the lower four spatial frequencies (e.g., see FIG. 3).

If, however, CPU 90 determines that the current tile is not a low-detail tile (decision box 106), then the current tile is encoded using standard JPEG compression procedures (box 110). After the encoded data has been generated, CPU 90 then operates to store the encoded data into Buffer 92. CPU 90 then determines if the contents of Buffer 92 (box 114) should be transmitted to Printer 80. In this embodiment, CPU 90 makes this determination by keeping a count of how many tiles have been encoded and stored into Buffer 92. Upon reaching a particular number, the contents of Buffer 92 are then transmitted to Printer 80 (box 116).

After CPU 90 determines whether to transmit the contents of Buffer 92 and the appropriate action taken, CPU 90 then determines whether there are any more tiles to decompose from the raster image. If so, then CPU 90 operates to decompose another tile (box 104) and to encode the tile according to the procedure just described.

In the embodiments just described, a four-value tile was used to represent each low-detail tile identified in the digital image. It is noted the present invention can also be practiced by using other types of low-resolution tiles to represent a low-detail tile. The low-resolution tile could be any appropriate pre-determined number of pixel values that can be used to simplify the encoding or a low-detail tile. For example, a single value tile, two-value or 16-value tile could be used to represent a tile determined to be a low-detail tile.

It is important to note that the present invention can be used with other compression techniques. This is illustrated in the co-pending application entitled: "Apparatus And Method For Compression Of Digital Images Having Background Pixels", having attorney's docket number 10981977-1, incorporated herein by reference.

It should be understood that the foregoing description is only illustrative of the invention. Various alternatives and modifications can be devised by those skilled in the art without departing from the invention. Accordingly, the present invention is intended to embrace all such alternatives, modifications and variances that fall within the scope of the appended claims.

What is claimed is:

1. A method for transforming a tile having more than four different pixel values into a series of basis function coefficients, the method comprising:

(a) determining if the tile classifies as a low detail tile; and (b) if the tile classifies as a low detail tile, then converting the tile into a first series of basis function coefficients, the first series including only four non-zero coefficients.

2. The method of claim 1, further comprising:

(c) it the tile does not classify as a low detail tile, then converting the tile into a second series of basis function coefficients, the second series including more than 4 non-zero coefficients.

3. The method of claim 2, wherein the first series of basis function coefficients is representative of a tile having only four different pixel values.

4. The method of claim 3, wherein each of the four different pixel values is an average value of a subset of the first number of different pixel values.

5. The method of claim 4, wherein the coefficients are DCT coefficients.

6. The method of claim 1, wherein step (b) includes:

quantizing the first series of coefficients so as to generate a first series of quantized coefficients; and encoding the first series of quantized coefficients.

7. The method of claim 6, further comprising:

(b) transmitting a print job, including the encoded first series of quantized coefficients, to a printer so as to cause the printer to print the tile.

8. An apparatus for compressing a digital image, comprising:

(a) means for decomposing the digital image into a set of tiles;

(b) means for classifying tiles from the set as low detail tiles; and (c) means for transforming each tile from the set into a series of basis function coefficients to represent the tile in the frequency domain, the transforming means being responsive to a first tile having more than four different pixel values and classified as a low detail tile by transforming the first tile into a first series of basis function coefficients; wherein the first series of basis function coefficients includes only four coeflicients that have a non-zero value.

9. The apparatus of claim 8, further comprising:

(d) means for converting the first series of coefficients into a first series of quantized coefficients; and (e) means for encoding the first series of quantized coefficients.

10. The apparatus of claim 9, wherein the first series of coefficients is representative of a tile having only four different pixel values.

11. The apparatus of claim 10, wherein each of the four different pixel values is an average value of a particular subset of the pixel values from the first tile.

12. The apparatus of claim 11, wherein the coefficients are DCT coefficients.

13. The apparatus of claim 10, further comprising:

(f) means for generating a print job that includes the encoded quantized coefficients; and (g) means for transmitting the print job to a printer for printing.

* * * * *